United States Patent [19]
Hamilton

[11] Patent Number: 5,826,000
[45] Date of Patent: Oct. 20, 1998

[54] SYSTEM AND METHOD FOR AUTOMATIC CONFIGURATION OF HOME NETWORK COMPUTERS

[75] Inventor: Graham Hamilton, Palo Alto, Calif.

[73] Assignee: Sun Microsystems, Inc., Palo Alto, Calif.

[21] Appl. No.: 613,432

[22] Filed: Feb. 29, 1996

[51] Int. Cl.⁶ .............................. G06F 9/24; G06F 15/16
[52] U.S. Cl. .............................. 395/182.02; 395/182.01; 364/DIG. 1; 364/DIG. 2
[58] Field of Search ................. 395/200.03, 200.01, 395/200.15, 200.16, 200.1, 617, 651, 200.12, 712, 182.02, 114, 601, 610, 856, 658, 684, 609, 462, 619, 762, 703, 187.01, 182.01, 182.05; 364/DIG. 1, DIG. 2; 379/96, 97, 207

[56] References Cited

U.S. PATENT DOCUMENTS 5,475,819  12/1995  Miller et al. ......................... 395/200.03
5,491,800   2/1996  Goldsmith et al. .................. 395/200.12
5,619,716   4/1997  Nonaka et al. ........................... 395/800

FOREIGN PATENT DOCUMENTS

0479660A2  9/1991  European Pat. Off. ..
0592079A2  7/1993  European Pat. Off. ..
 97301175   5/1997  European Pat. Off. ..

Primary Examiner—Daniel H. Pan
Attorney, Agent, or Firm—Gary S. Williams; Flehr Hohbach Test Albritton & Herbert LLP

[57] ABSTRACT

An automated configuration system and method configures home network client computers, including determining local service provider information, without any user assistance. The distributed computer network includes network home client computers and at least one autoconfiguration server. When the home network client computer is powered on it determines whether it possesses the requisite configuration information. If not, the home network client computer sends a configuration request along with client computer identifying information to the autoconfiguration server. The autoconfiguration server uses the client identifying information to determine a local service provider information and client computer specific data. The autoconfiguration server determines the local service provider information by looking up a directory of local service providers, the directory being stored on the autoconfiguration server or on another server. The autoconfiguration server determines the client computer specific data by accessing a database containing client computer information for each home network client computer, the database being stored either on the autoconfiguration server itself or on another server. The client computer specific data is stored in the database at the time of sale or shipment of the home network computer to the user. Local service provider information and the client computer specific data are downloaded to the requesting home network client computer. The home network client computer uses the configuration information downloaded by the autoconfiguration server to configure itself and establish a connection to the local service provider.

12 Claims, 4 Drawing Sheets

SYSTEM AND METHOD FOR AUTOMATIC CONFIGURATION OF HOME NETWORK COMPUTERS

The present invention relates generally to configuration of home network computers, and particularly to a system and method for performing the configuration automatically upon power on of the home network computer, without any user intervention, the configuration procedure being customized for that particular home network computer user's needs.

BACKGROUND OF THE INVENTION

All computers have to undergo some sort of configuration procedure before they can be effectively used by end users. This configuration procedure consists of but is not limited to steps such as loading the appropriate operating system, configuring the computer system parameters, setting up the user system environment, loading hardware device drivers, and loading application software as required by the end user. It is also desirable that the configuration process be customized to meet the requirements of each particular end user. This customized configuration requirement further complicates the configuration process. The permutations and combinations of the above-mentioned steps can get quite complicated and completely overwhelm many computer users. Thus, there is a outstanding need for a configuration process which can not only customize the configuration according a particular end user's needs but at the same time reduce the complexity of the configuration process so that it can be effectively used by both expert and novice computer users. With the advent and popularity of E-mail and other network services, it is also desirable that the end user's computer be set up to connect to a local service provider who provides these services. Preferably, this should also be achieved as part of the configuration process.

The configuration methods currently used and taught by the prior art can be classified as either (a) sending the configuration information to the end user and asking the end user to perform the configuration by reading a Users' Manual, or (b) shipping a pre-configured computer to the end user. As discussed below, both of these methods have flaws and shortcomings in achieving the desired goals mentioned above.

The most commonly used method for computer configuration entails shipping the configuration software media to the end user along with a User's Manual. The User's Manual usually contains detailed instructions the end user has to follow for completion of the configuration process. The problem with this method is that the end user has to read and comprehend the instructions in the Users's Manual to successfully perform the configuration task. Many times this can be quite a tedious and non-user friendly task. Furthermore, the complexity is increased manyfold if the end user desires to customize the configuration for his or her particular needs.

Shipping a pre-configured computer to the end user also has its shortcomings. Although this method is very user friendly, as there is no end user involvement, the computers which are shipped are generically configured. Thus, there is no customization whatsoever to meet the end user's particular needs. Furthermore, computer vendors do not like to stock pre-configured computer systems as they create a multitude of inventory problems--problems keeping track of the level of software the computers are configured with, problems with having to repeat the configuration process with the release of a new version of the configured software, problems with making sure that the "right" computer is shipped to the user.

Thus, both of the methods mentioned above fail to achieve the simplicity and level of customization required of the configuration process. Furthermore, none of the methods discussed have the capability to automatically determine local service provider information for a given home network computer as part of the configuration process.

The present invention overcomes the shortcomings of the above-mentioned methods by providing a completely automated system and method for configuring home network computers. The invention makes the configuration process user friendly by eliminating the need for any type of user interaction during the configuration process. Thus, the configuration of the home network computer is completely transparent to the end user. Furthermore, since the configuration system and method utilize end user information recorded by the vendor during the sale of the home network computer, the configuration can be customized to suit the end user's particular needs. As part of the configuration process, the invention is also able to automatically determine the local service provider information for a given home network computer.

SUMMARY OF THE INVENTION

In summary, the present invention is a system and method for the automatic configuration of home network computers. The automatic configuration is made possible using a distributed network of home network computers, which act as clients in the distributed network (home network client computers), autoconfiguration server, and other sales servers and local service provider servers as needed.

Upon power on, a home network client computer determines if it has access to the requisite configuration information needed to successfully configure itself. This requisite information consists of local service provider information and client computer specific data. If the requisite configuration information is not available, the home network client computer sends a request to an autoconfiguration server requesting the requisite information. The request sent to the autoconfiguration server includes client computer identifying information for the requesting home network client computer. This client computer identifying information consists of either a telephone number or a serial number uniquely associated with the home network client computer, or both.

Upon receiving the request from a home network client computer, the autoconfiguration server uses the client identifying information to determine the local service provider information and client computer specific data needed for configuration of the requesting home network client computer. The local service provider information is determined from a directory of local service providers which can be accessed by the autoconfiguration server. The client computer specific data is stored in a client computer information database which can also be accessed by the autoconfiguration server. The client computer specific data is collected and stored in conjunction with the sale or acquisition of the home network client computer by the end user, and preferably includes client computer serial number, client computer model information, sales information identifying the end user or designated recipient of the home network client computer, and other end user specific configuration information such as customer configuration choices made when the customer purchased or ordered the computer.

The autoconfiguration server uses the client identifying information provided in the request to find local service provider information and client computer specific data corresponding to the particular requesting home network client computer. The local service provider information and the client computer specific data is then downloaded to the requesting home network client computer.

The requesting home network client computer then uses the requisite configuration information received from the autoconfiguration server to configure itself. A connection is also established with the local service provider.

BRIEF DESCRIPTION OF THE DRAWINGS

Additional object and features of the invention will be more readily apparent from the following detailed description and appended claims when taken in conjunction with the drawings, in which:

DESCRIPTION OF THE PREFERRED EMBODIMENT

Figure 1:
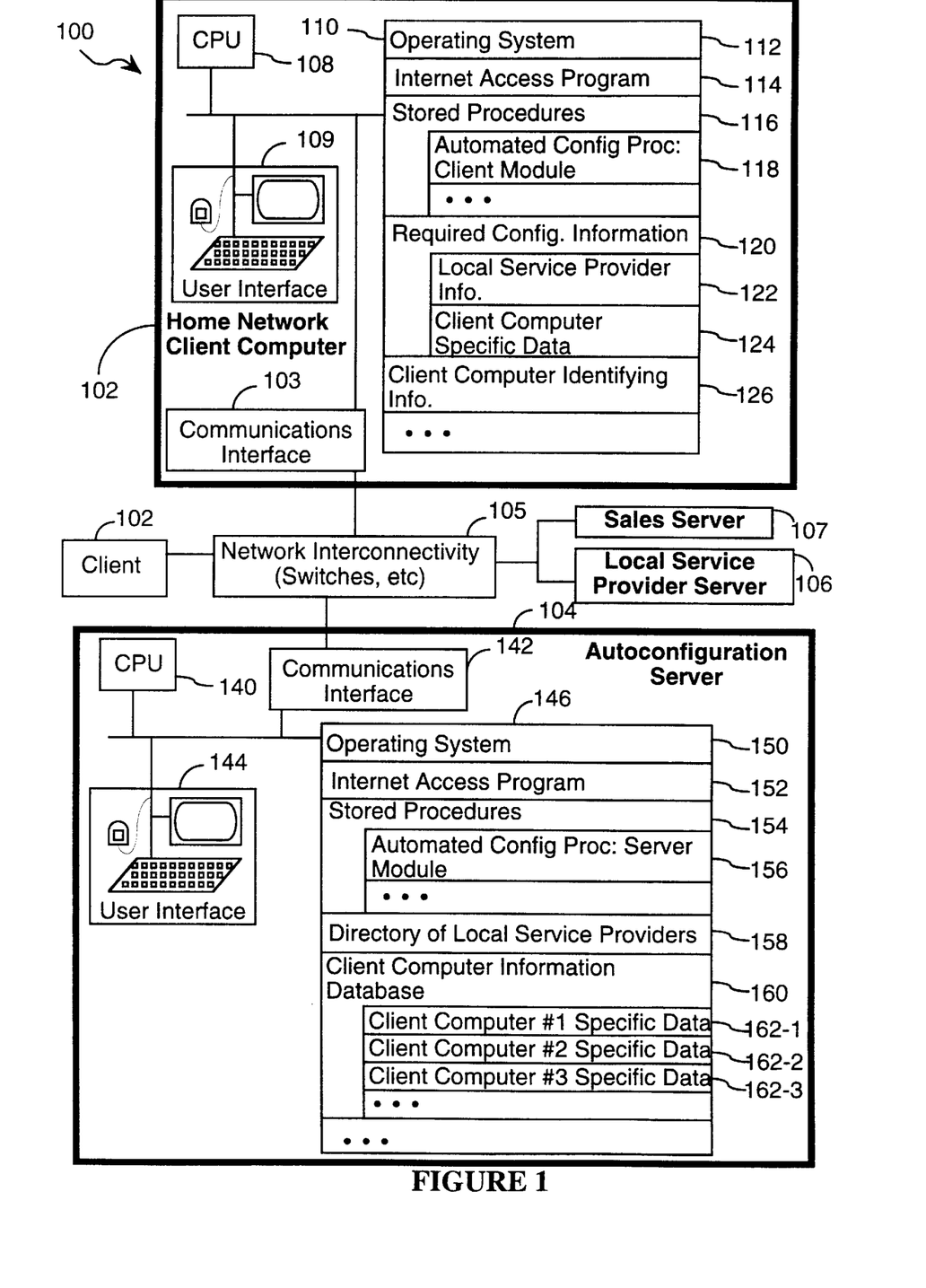
FIG. 1 is a block diagram of a distributed computer system incorporating the present invention.

Referring to FIG. 1, there is shown a distributed computer system 100 having many home network client computers 102 and at least one remotely located autoconfiguration server 104. In the preferred embodiment each home network client computer is connected to the autoconfiguration server 104 via a communications network 105 such as the Internet or any other similar network provider. The home network client computers 102 are generally desktop computers.

In the preferred embodiment, each home network client computer 102 includes a communications interface 103 for communicating with the autoconfiguration server 104 or for connecting to a local service provider server 106, a central processing unit (CPU) 108, a user interface 109, and memory 110. Memory I/O stores an operating system 112, an Internet access program 114, stored procedures 116 to be executed by the CPU 108, required configuration information 120, and client computer identifying information 126. The stored procedures 116 include at least one automated configuration procedure client module 118 which when executed by the CPU 108 handles the autoconfiguration process from the client's side.

The required configuration information 120 that the home network client computer 102 needs for successfully configuring itself includes local service provider information 122, and client computer specific data 124. The local service provider information 122 is required to enable the client to connect to the local service provider, while the client computer specific data 124 contains information such as the client computer serial number, client computer model information, sales information, and other user specific configuration information, which is required for customized configuration of the home network client computer 102.

The autoconfiguration server 104 includes a central processing unit (CPU) 140, a communications interface 142 for connecting to the client computers 102, to sales servers 107, or to local service provider servers 106, a user interface 144, and memory 146. Memory 146 stores an operating system 150, an Internet access program 152, stored procedures 154 to be executed by the CPU 140, a directory of local service providers 158, and a database containing client computer information 160. The stored procedures 154 Include at least one automated configuration procedure server module 156 which when executed by the CPU 140 handles the autoconfiguration process from the autoconfiguration server's side.

Although in the preferred embodiment the directory of local service providers 158 is stored in the memory 146 of the autoconfiguration server 104, the directory of local service providers 158 could also be stored on local service provider server 106 linked to the autoconfiguration server 104. In this alternate embodiment, the autoconfiguration server 104 can query the linked local service provider server 106 to get access to the directory of local service providers 158. In this alternate embodiment, there could be a multitude of such local service provider servers 106 networked to the autoconfiguration server 104.

While in the preferred embodiment the database containing client computer information 160 is stored in the memory of the autoconfiguration server 104, the database 160 could also be stored on sales servers 107 linked to the autoconfiguration server 104. In this alternate embodiment, the autoconfiguration server 104 can get access to the required client computer specific data 162-1,2,3 by either querying the sales servers 107 for the information or the sales servers 107 could send the information to the autoconfiguration server 104 at regular time intervals. For example, the sales servers 107 could download the client computer specific data 162 to the autoconfiguration server 104 at the end of each day or at regular hourly intervals.

Figure 4:
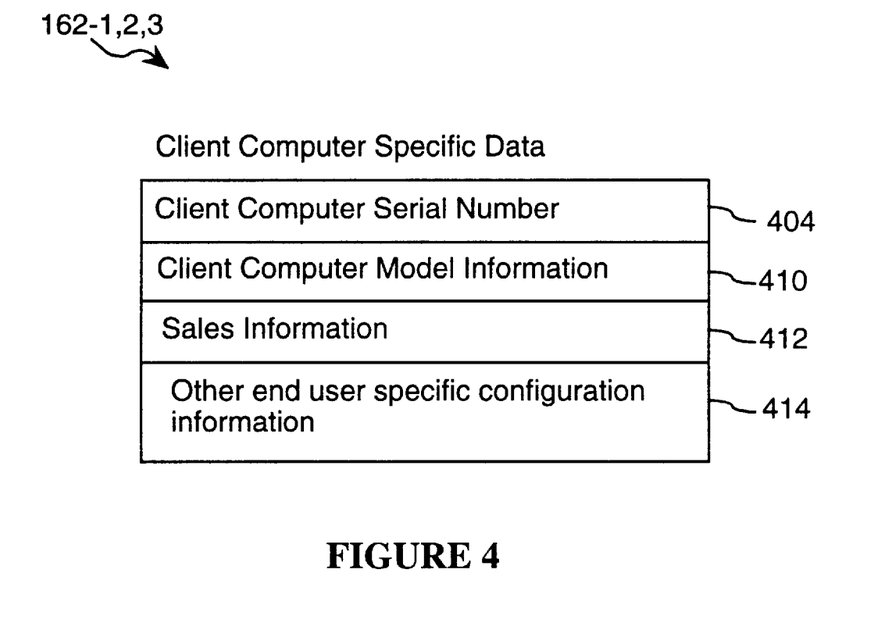
FIG. 4 is an illustration showing the contents of client computer specific data for a single home network client computer, a collection of such client computer specific data being stored in the client computer information database.

In either embodiment, the client computer information database 160 stores Information which contains client computer specific data 162-1,2,3 for each home network client computer 102 sold to the end user. As shown in FIG. 4, the client computer specific data 162 includes the client computer serial number 404 uniquely identifying the client computer 102, client computer model information 410, sales information 412 detailing particulars of the recipient of the client computer, and other end user specific configuration information 414. End user specific configuration information 414 can include software features or service features selected by the end user at the time the end user's computer was purchased or ordered. In either embodiment, the autoconfiguration server generally uses the client computer serial number as an index key to access the client computer specific data 162 relating to a particular home network client computer 102 in the database 160. The client computer specific data 162 is normally collected and stored at the time of sale/purchase/acquisition/shipment of the home network client computer 102. This makes it possible to store information which is customized for each client computer buyer.

Figure 2:
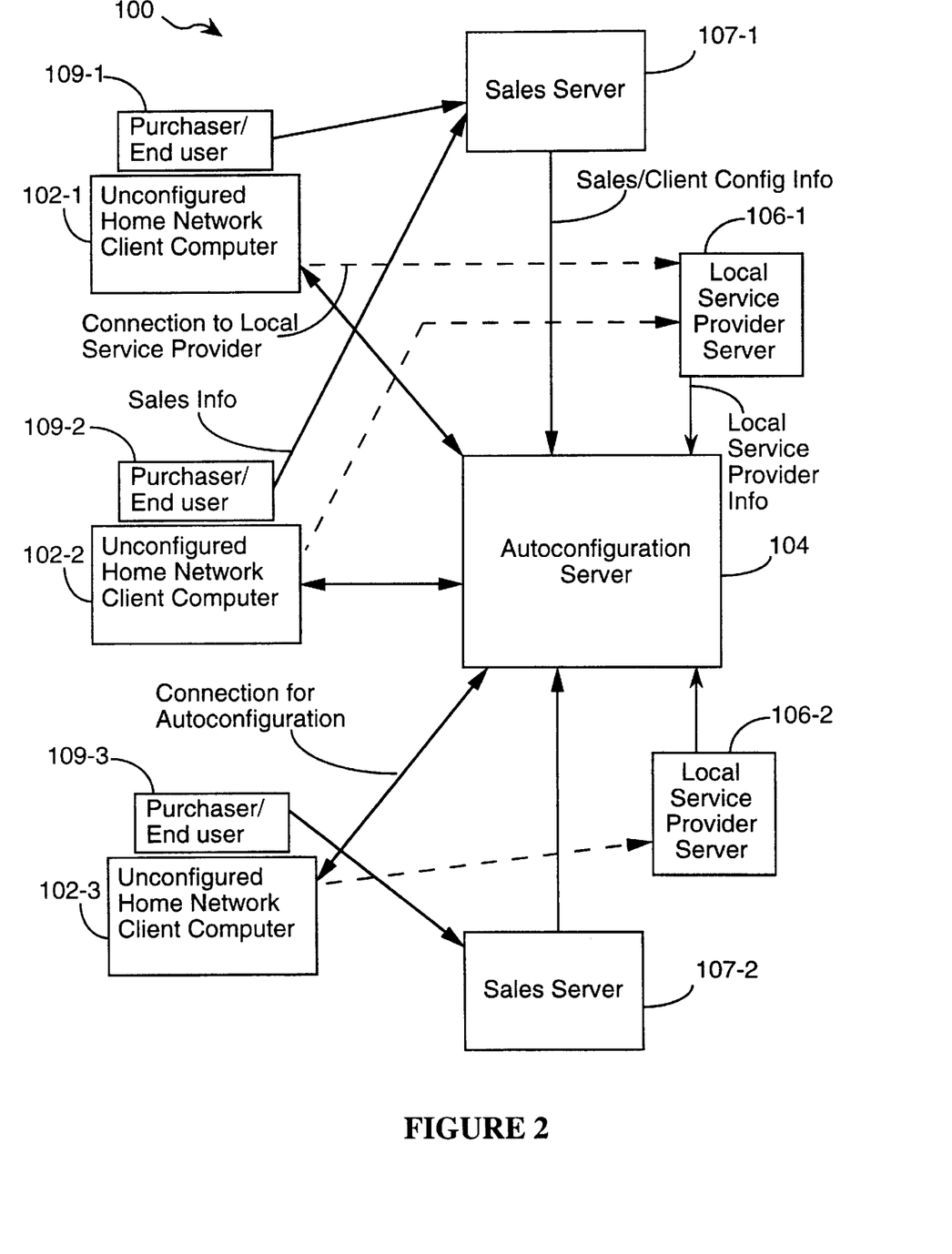
FIG. 2 is a block diagram depicting an exemplary distributed network layout of the various components comprising the present invention.

Referring to FIG. 2, there is shown a typical distributed network layout of the various components involved in the present invention. The network consists of one or more home network client computers 102-1,2,3 each linked to an autoconfiguration server 104. The home network client computers 102-1,2,3 use a connection to the autoconfiguration server 104 to request the requisite configuration information. The connection is also used by the autoconfiguration server 104 to send the requested configuration information to the requesting home network client computer 102-1,2,3.

The autoconfiguration server 104 may also be linked to sales servers 107-1,2 and local service provider servers 106-1,2. The sales servers 107-1,2 maintain a database of client computer information for each home network client computer. The database contains data specific to each client computer which is recorded at time of sale/purchase/acquisition/shipment of the home network client computer to the purchaser or end user 109-1,2,3. This client computer information stored in the database is downloaded to the autoconfiguration server either periodically or upon request from the autoconfiguration server. The local service provider servers 106-1,2 contain a directory of the local service providers which is accessed by the autoconfiguration server to find local service provider information for a given home client network computer 102. As mentioned earlier, the client computer information database and the directory of local service providers may also be stored on the autoconfiguration server.

Figure 3:
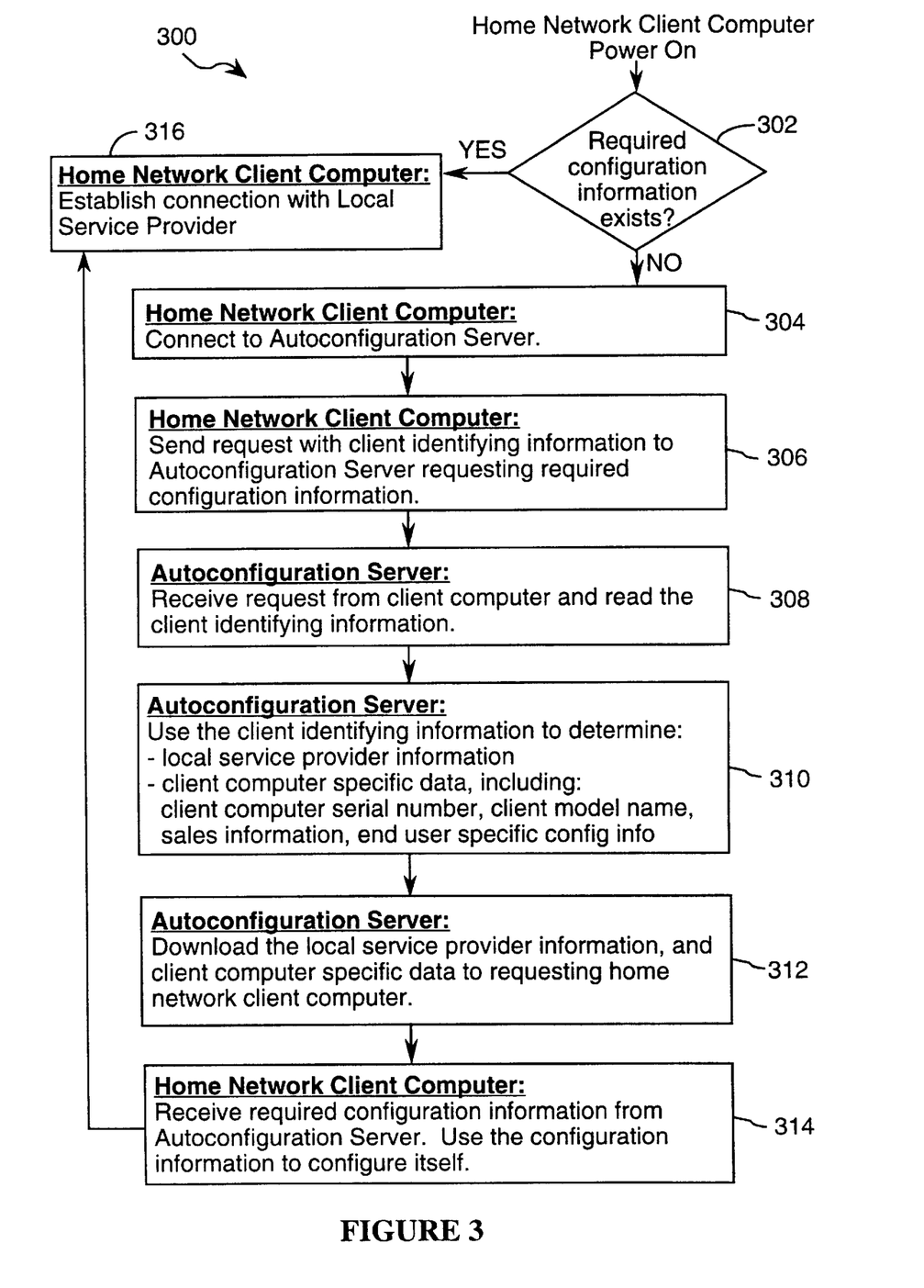
FIG. 3 is a flow chart of the process for automatically configuring a home network client computer, without any user assistance, initiated upon power on of the home network client computer.

FIG. 3 is a flow chart of the process 300 for automated configuration of the home network client computer without user assistance. The process is initiated when the user powers on the home network client computer.

At step 302 the home network client computer executes the automated configuration procedure client module 118 to determine if the home network client computer has the requisite configuration information to successfully configure itself. As shown in FIG. 1, the configuration information required for a successful configuration includes the local service provider information, and client computer specific data. If the home network client computer determines that it possesses the requisite configuration information, then a connection is established with the local service provider as shown in step 316. If the home network client computer does not possess the requisite configuration information, then the process continues with step 304.

At step 304 the home network client computer opens a connection with an autoconfiguration server. This connection is used both to send a request to the autoconfiguration server and to receive the requested configuration information from the autoconfiguration server.

At step 306, the home network client computer uses the connection established in step 304 to send a request for configuration to the autoconfiguration server. The request sent by the home network client computer to the autoconfiguration server includes client identifying information which is unique to the home network client computer. This client identifying information consists of either a telephone number or a serial machine number for the home network client computer, or both.

In the preferred embodiment, the autoconfiguration server uses the "Caller ID" service provided by its telephone service company to determine the telephone number from which the home network client computer is calling. Alternately, the user could be asked to provide the telephone number if the Caller ID service is not available.

At step 308 the autoconfiguration server receives a configuration request from a requesting home network client computer. On receiving the request, the autoconfiguration server reads the client identifying information sent as part of the request. This client identifying information uniquely identifies the requesting home network client computer.

At step 310 the autoconfiguration server uses the client identifying information read in step 308 to determine the local service provider information and the client computer specific data corresponding to the requesting home network client computer.

The local service provider information is determined by looking up a directory of local service providers. More particularly, the home network client computer's telephone number includes a first portion (i.e. the area code and the three digit prefix) that identifies a geographic region in which the home network client computer is located. The directory of local service providers includes entries suitable for mapping the first portion of the telephone number associated with the requesting home network client computer to a local service provider.

If the local service provider directory is stored on the autoconfiguration server itself, then the local service provider information is determined by directly looking up the local service provider information corresponding to the home network client computer's telephone number. If the local service provider directory is stored on a local service provider server, then the autoconfiguration server can access the information by establishing a connection with the local service provider server. Using the connection established with the local service provider server, the autoconfiguration server can directly access the directory stored on the particular local service directory server, or request the local service provider server to send the required information to the autoconfiguration server.

The autoconfiguration server determines the client computer specific data by accessing a database containing information for each home network client computer that has been sold. This database containing client information may be stored on the autoconfiguration server itself, or on some sales server. If the database is stored on the autoconfiguration server itself, the database can be directly accessed and the required client computer specific data corresponding to the client computer serial number can be ascertained. If the database is stored on a sales server, there are a variety of methods by which the autoconfiguration server can access the information. One method is for the sales server to send the client computer specific data to the autoconfiguration server when requested by the autoconfiguration server. Another method is for the sales server to download the entire database to the autoconfiguration server at periodic intervals. This could be at the end of each day or at set hourly intervals. Once the database information has been downloaded to the autoconfiguration server, the autoconfiguration server can access the information as and when required. Other similar techniques can also be used depending on their efficiency.

The contents of each client computer specific data are shown in FIG. 4. As mentioned earlier, the client computer specific data is stored during the purchase/sale/acquisition of the home network client computer.

At step 312 the autoconfiguration server downloads the local service provider information and the client computer specific data gathered in step 310 to the requesting home network client computer.

At step 314, the home network client computer receives the configuration information sent by the autoconfiguration server. The home network client computer then uses this configuration information to configure itself. Upon successful configuration, the home network client computer establishes a connection with the local service provider as shown in step 316.

In one alternate embodiment of the invention, the client identifying information sent by the home network client computer includes only the telephone number associated with the home network client computer. Since the client identifying information does not contain the serial number of the client computer, the autoconfiguration server cannot uniquely identify the requesting home network client computer. As a result, the autoconfiguration server does not determine the client computer specific data for the requesting home network client computer. However, the telephone number does allow the autoconfiguration server to determine the local service provider information for the requesting home network client computer, as described earlier.

In another alternate embodiment, the client identifying information sent by the home network client computer includes only serial number uniquely identifying the home network client computer. In this embodiment the telephone company "Caller ID" service is not used to determine the telephone number of the calling home network client computer. However, int his embodiment information regarding the geographic location of the home network client computer is collected and stored in the client computer specific data at the time the client computer is sold or ordered. This geographic information is needed in any case, to determine where to ship the client computer and for other similar purposes. The autoconfiguration server can then use the client computer serial number to access client computer specific data and find the recorded geographic location of the home network client computer. The geographic location can then be used to determine the local service provider information for the requesting home network client computer.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for automatic configuration of home network client computers comprising the steps of:
   a) receiving requests from said home network client computers for autoconfiguration, said requests each providing client computer identifying information;
   b) using said client computer identifying information in said request to determine
      i) local service provider information, selected from information in a predefined directory of local service providers; and
      ii) client computer specific data corresponding to said client computer identifying information, selected from a database of client computer information; wherein at least a portion of the client computer specific data for each one of the home network client computers includes data selected from the group consisting of computer model information for the one computer, data identifying an internal hardware or software configuration of the one computer, and data identifying a designated end user or recipient of the one computer; and
   c) providing instructions for downloading said local service provider information, and said client computer specific data to a respective home network client computer.

2. The method of claim 1, wherein
   said client computer identifying information includes a serial number uniquely associated with said home network client computer, and
   said database of client computer information includes data for said home network client computers that is collected and stored in conjunction with acquisition or sale of said home network client computers and/or shipment of said home network client computers to designated recipients, wherein said stored data for each respective home network client computer indicates a respective serial number, a client computer model or configuration, sales information identifying said designated recipient of said respective home network client computer, and configuration information specific to said designated recipient.

3. A method for automatic configuration of home network client computers comprising the steps of:
   a) receiving requests from the home network client computers for autoconfiguration, each requests providing client computer identifying information;
   b) using the client computer identifying information in the request to determine
      i) local service provider information, selected from information in a predefined directory of local service providers; and
      ii) client computer specific data corresponding to the client computer identifying information, selected from a database of client computer information; and
   c) providing instructions for downloading the local service provider information, and the client computer specific data to a respective home network client computer;
   wherein
      the client computer identifying information includes a telephone number associated with the home network client computer, wherein the telephone number includes a first portion that identifies a geographic region in which the home network client computer is located; and
      the directory of local service providers includes entries suitable for mapping the first portion of the telephone number associated with the home network client computer to a local service provider.

4. A method for automatic configuration of a home network client computer, comprising the steps of:
   when said home network client computer is powered on, determining whether said home network client computer lacks required configuration information, said required configuration information including information concerning a local service provider, and client computer specific data;
   if said home network client computer is determined to lack any of said required configuration information, then performing the steps of:
      connecting to an autoconfiguration server;
      sending a configuration request to said autoconfiguration server, said request including client computer identifying information associated with said home network client computer;
      receiving from said autoconfiguration server said required configuration information; and
      said home network client computer using said received configuration information to configure itself; and
   when said home network client computer has the required configuration information and has been configured therewith, automatically establishing a connection to said local service provider.

5. The method of claim 4, wherein
   said client computer identifying information includes a serial number uniquely associated with said home network client computer, and
   said database of client computer information includes data for said home network client computers that is collected and stored in conjunction with acquisition or sale of said home network client computers and/or shipment of said home network client computers to designated recipients, wherein said stored data for each respective home network client computer indicates a respective serial number, a client computer model or configuration, sales information identifying said designated recipient of said respective home network client computer, and configuration information specific to said designated recipient of said respective home network client computer.

6. The method of claim 4, wherein said client computer identifying information includes a telephone number associated with said home network client computer, wherein said telephone number includes a first portion that identifies a geographic region in which said home network client computer is located;

said directory of local service providers includes entries suitable for mapping said first portion of said telephone number associated with said home network client computer to a local service provider.

7. An autoconfiguration server for configuring home network client computers, comprising:

a communication interface for receiving requests from the home network client computers for autoconfiguration, each request providing client computer identifying information;

a data processor, coupled to the communication interface;

the data processor further coupled to a predefined directory of local service providers and a database of client computer information;

a memory coupled to the data processor, the memory storing procedures for execution by the data processor;

the stored procedures including a configuration procedure for using the client computer identifying information in each request to determine local service provider information, selected from information in the predefined directory of local service providers, and to further determine client computer specific data corresponding to the client computer identifying information, selected from the database of client computer information; the configuration procedure further including instructions for downloading the local service provider information, and the client computer specific data to a respective home network client computer;

wherein at least a portion of the client computer specific data for each one of the home network client computers includes data selected from the group consisting of computer model information for the one computer, data identifying an internal hardware or software configuration of the one computer, and data identifying a designated end user or recipient of the one computer.

8. The system of claim 7, wherein:

the client computer identifying information includes a serial number uniquely associated with the home network client computer, and the database of client computer information includes data for the home network client computers that is collected and stored in conjunction with acquisition or sale of the home network client computers and/or shipment of the home network client computers to designated recipients, wherein the stored data for each respective home network client computer indicates a respective serial number, a client computer model or configuration, sales information identifying the designated recipient of the respective home network client computer, and configuration information specific to the designated recipient of the respective home network client computer.

9. An autoconfiguration server for configuring home network client computers, comprising:

a communication interface for receiving requests from the home network client computers for autoconfiguration, each request providing client computer identifying information;

a data processor, coupled to the communication interface;

the data processor further coupled to a predefined directory of local service providers and a database of client computer information;

a memory coupled to the data processor, the memory storing procedures for execution by the data processor;

the stored procedures including a configuration procedure for using the client computer identifying information in each requests to determine local service provider information, selected from information in the predefined directory of local service providers, and to further determine client computer specific data corresponding to the client computer identifying information, selected from the database of client computer information; the configuration procedure further including instructions for downloading the local service provider information, and the client computer specific data to a respective home network client computer;

wherein:

the client computer identifying information includes a telephone number associated with the home network client computer, wherein the telephone number includes a first portion that identifies a geographic region in which the home network client computer is located; and the directory of local service providers includes entries suitable for-mapping the first portion of the telephone number associated with the home network client computer to a local service provider.

10. A client configuration system for automatic configuration of a home network client computer, comprising:

a communication interface for sending requests from said home network client computer for autoconfiguration, said requests each providing client computer identifying information;

a data processor coupled to said communication interface;

a memory coupled to said data processor, said memory storing procedures for execution by said data processor;

said stored memory procedures including a client configuration procedure for determining, when said home network client computer is powered on, whether said home network client computer lacks required configuration information, said required configuration information including information concerning a local service provider, and client computer specific data;

if said home network client computer is determined to lack any of said required configuration information, then said client configuration procedure further:

using said communication interface to send said request to an autoconfiguration server;

receiving said required configuration information from said autoconfiguration server;

using said configuration information received from said autoconfiguration server to configure said home network client computer;

when said home network client computer has the required configuration information and been configured therewith, automatically establishing a connection to said local service provider.

11. The system of claim 10, wherein said client computer identifying information includes a serial number uniquely associated with said home network client computer, and said database of client computer information includes data for said home network client computers that is collected and stored in conjunction with acquisition or sale of said home network client computers and/or shipment of said home network client computers to designated recipients, wherein said stored data for each respective home network client computer indicates a respective serial number, a client computer model or configuration, sales information Identifying said designated recipient of said respective home network client computer, and configuration information specific to said designated recipient of said respective home network client computer.

12. The system of claim 10, wherein said client computer identifying information includes a telephone number associated with said home network client computer, wherein said telephone number includes a first portion that identifies a geographic region in which said home network client computer is located;

said directory of local service providers includes entries suitable for mapping said first portion of said telephone number associated with said home network client computer to a local service provider.

* * * * *